(12) United States Patent
Hartog et al.

(10) Patent No.: US 10,579,388 B2
(45) Date of Patent: Mar. 3, 2020

(54) POLICIES FOR SHADER RESOURCE ALLOCATION IN A SHADER CORE

(71) Applicant: Advanced Micro Devices, Inc., Santa Clara, CA (US)

(72) Inventors: Robert Scott Hartog, Windermere, FL (US); Mark Leather, Los Gatos, CA (US); Michael Mantor, Orlando, FL (US); Rex McCrary, Orlando, FL (US); Sebastien Nussbaum, Boxborough, MA (US); Philip J. Rogers, Austin, TX (US); Ralph Clay Taylor, Deland, FL (US); Thomas Woller, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 39 days.

(21) Appl. No.: 16/040,224

(22) Filed: Jul. 19, 2018

(65) Prior Publication Data
US 2018/0321946 A1   Nov. 8, 2018

Related U.S. Application Data

(63) Continuation of application No. 13/325,286, filed on Dec. 14, 2011, now abandoned.

(51) Int. Cl.
*G06F 9/38* (2018.01)
*G06F 9/48* (2006.01)
*G06T 1/20* (2006.01)

(52) U.S. Cl.
CPC .......... *G06F 9/3851* (2013.01); *G06F 9/3879* (2013.01); *G06F 9/4881* (2013.01); *G06T 1/20* (2013.01)

(58) Field of Classification Search
None
See application file for complete search history.

(56) References Cited

U.S. PATENT DOCUMENTS

| 4,953,081 A | 8/1990 | Feal et al. |
| 5,371,887 A | 12/1994 | Yoshida et al. |

(Continued)

FOREIGN PATENT DOCUMENTS

| EP | 1326165 A2 | 7/2003 |
| EP | 1450257 A2 | 8/2004 |

(Continued)

*Primary Examiner* — Saptarshi Mazumder
(74) *Attorney, Agent, or Firm* — Volpe and Koenig, P.C.

(57) ABSTRACT

A method for use in a processor for arbitrating between multiple processes to select wavefronts for execution on a shader core is provided. The processor includes a compute pipeline configured to issue wavefronts to the shader core for execution, a hardware queue descriptor associated with the compute pipeline, and the shader core. The shader core is configured to execute work for the compute pipeline corresponding to a first memory queue descriptor executed using data for the first memory queue descriptor that is loaded into a first hardware queue descriptor. The processor is configured to detect a context switch condition, and, responsive to the context switch condition, perform a context switch operation including loading data for a second memory queue descriptor into the first hardware queue descriptor. The shader core is configured to execute work corresponding to the second memory queue descriptor that is loaded into the first hardware queue descriptor.

20 Claims, 8 Drawing Sheets

(56) References Cited

U.S. PATENT DOCUMENTS

| | | |
|---|---|---|
| 5,884,077 A | 3/1999 | Suzuki |
| 6,055,579 A | 4/2000 | Goyal et al. |
| 6,781,956 B1 | 8/2004 | Cheung |
| 8,085,272 B1 * | 12/2011 | Molnar ................ G06T 15/005 345/501 |
| 2004/0268350 A1 | 12/2004 | Welland et al. |
| 2006/0085600 A1 | 4/2006 | Miyashita et al. |
| 2009/0160867 A1 | 6/2009 | Grossman |
| 2011/0110083 A1 | 5/2011 | Pahlke et al. |
| 2011/0115802 A1 * | 5/2011 | Mantor ................ G06F 9/5027 345/520 |
| 2011/0154346 A1 * | 6/2011 | Jula ...................... G06F 9/4881 718/103 |

FOREIGN PATENT DOCUMENTS

| | | |
|---|---|---|
| WO | 2011/028986 A2 | 3/2011 |
| WO | 2011/053891 A2 | 5/2011 |

* cited by examiner

| TIME | Queue Change/Action | QUEUE SEL |
|---|---|---|
| T0 | => Q0  QA=1, QP=5, QE=1, QD=2 | Q0 |
| T 1.000 | => Q7  QA=1, QP=0, QE=1, QD=2 | Q0 |
| T10.000 | => Q0 quantum expires, no queues at same or higher priority, continue | Q0 |
| T11.000 | => Q1  QA=1, QP=5, QE=1, QD=2  (Q0 quantum expired, switch) | Q1 |
| T21.000 | => Q1 quantum expired, swap to next queue of same priority | Q0 |
| T24.000 | => Q2  QA=1, QP=8, QE=1, QD=2  (highest priority) | Q2 |
| T28.000 | => Q2 processes packet to wait on semaphore, switch to next avail | Q1 |
| T38.000 | => Q1 quantum expired, swap to next queue of priority level | Q0 |
| T40.000 | => Q2 semaphore satisfied and Q2 ready (highest priority, pre-empt) | Q2 |
| T44.000 | => Q2 queue & pipe empty, nxt queue of priority level 5 | Q1 |
| T46.000 | => Q1 queue & pipe empty, nxt queue of priority level 5 | Q0 |
| T49.000 | => Q0 queue & pipe empty, nxt queue of priority level 0 | Q7 |
| T51.000 | => Q2 becomes ready (highest priority, pre-empt) | Q2 |
| T55.000 | => Q3  QA=1, QP=10, QE=0, QD=0  (highest pre-empt) | Q3 |
| T56.000 | => Q4  QA=1, QP=10, QE=0, QD=0 | Q3 |
| T59.000 | => Q3 issues a packet resetting it's QP=10, enabling switch same priority | Q4 |
| T66.000 | => Q4 issues a packet resetting Q3 QP=11, creating a higher priority queue | Q3 |
| T67.000 | => Q2 becomes ready – no action because not high priority | Q3 |
| T70.000 | => Q3 issues a packet resetting Q3 & Q4 to QP4 decreasing priority of sys | Q2 |

FIG. 6

Least Recently Issued H→L Priority List for P0-P7

| Time | | | | | | | | | | |
|------|------|------|------|------|------|------|------|------|--------|--------|
| T0   | P0(-)  | P1(H)  | P2(-)  | P3(-)  | P4(-)  | P5(-)  | P6(-)  | P7(-)  | HP3D(-)  | GFX(-)  |
| T1   | P0(-)  | P2(-)  | P3(-)  | P4(M)  | P5(H)  | P6(-)  | P7(-)  | P1(H)  | HP3D(-)  | GFX(-)  |
| T2   | P0(M)  | P2(L)  | P3(L)  | P4(M)  | P5(H)  | P6(M)  | P7(M)  | P1(H)  | HP3D(-)  | GFX(-)  |
| T3   | P0(M)  | P2(L)  | P3(L)  | P4(M)  | P6(M)  | P7(M)  | P1(H)  | P5(-)  | HP3D(-)  | GFX(-)  |
| T4   | P0(M)  | P2(L)  | P3(L)  | P4(M)  | P6(M)  | P7(M)  | P5(-)  | P1(H)  | HP3D(-)  | GFX(-)  |
| T5   | P2(L)  | P3(L)  | P4(M)  | P6(M)  | P7(M)  | P5(-)  | P1(H)  | P0(M)  | HP3D(-)  | GFX(-)  |
| T6   | P2(L)  | P3(L)  | P4(M)  | P6(M)  | P7(M)  | P5(-)  | P0(M)  | P1(H)  | HP3D(X)  | GFX(-)  |
| T7   | P2(L)  | P3(L)  | P4(M)  | P6(M)  | P7(M)  | P5(L)  | P0(M)  | P1(-)  | HP3D(-)  | GFX(X)  |
| T8   | P2(L)  | P3(L)  | P4(M)  | P6(M)  | P5(L)  | P0(M)  | P1(-)  | P7(M)  | HP3D(-)  | GFX(X)  |
| T9   | P2(L)  | P3(L)  | P4(M)  | P5(L)  | P0(M)  | P1(-)  | P7(-)  | P6(M)  | HP3D(-)  | GFX(X)  |
| T10  | P2(L)  | P3(L)  | P5(L)  | P0(M)  | P1(L)  | P7(-)  | P6(-)  | P4(M)  | HP3D(-)  | GFX(X)  |

FIG. 7

POLICIES FOR SHADER RESOURCE ALLOCATION IN A SHADER CORE

CROSS REFERENCE TO RELATED APPLICATION

This application is a continuation of U.S. patent application Ser. No. 13/325,286, filed Dec. 14, 2011 which is incorporated by reference as if fully set forth.

FIELD OF INVENTION

The present invention is generally directed to computing systems. More particularly, the present invention is directed to arbitration policies for allocating graphic processing unit resources among multiple pipeline inputs.

BACKGROUND

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available only for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of the CPU and GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

Both the discrete and single chip arrangements can limit the types of commands that can be sent to the GPU for execution. By way of example, computational commands (e.g., physics or artificial intelligence commands) often cannot be sent to the GPU for execution. This limitation exists because the CPU may relatively quickly require the results of the operations performed by these computational commands. However, because of the high overhead of dispatching work to the GPU in current systems and the fact that these commands may have to wait in line for other previously-issued commands to be executed first, the latency incurred by sending computational commands to the GPU is often unacceptable.

Given that a traditional GPU may not efficiently execute some computational commands, the commands must then be executed within the CPU. Having to execute the commands on the CPU increases the processing burden on the CPU and can hamper overall system performance.

Although GPUs provide excellent opportunities for computational offloading, traditional GPUs may not be suitable for system-software-driven process management that is desired for efficient operation in some multi-processor environments. These limitations can create several problems.

For example, since processes cannot be efficiently identified and/or preempted, a rogue process can occupy the GPU hardware for arbitrary amounts of time. In other cases, the ability to context switch off the hardware is severely constrained—occurring at very coarse granularity and only at a very limited set of points in a program's execution. This constraint exists because saving the necessary architectural and microarchitectural states for restoring and resuming a process is not supported. Lack of support for precise exceptions prevents a faulted job from being context switched out and restored at a later point, resulting in lower hardware usage as the faulted threads occupy hardware resources and sit idle during fault handling.

Arbitration occurs at two different levels within a computer system. One level relates to what job is being driven at the front end of the GPU compute pipeline. The other level relates to utilization of shared resources. Because there are multiple tasks being executed simultaneously, these tasks must be prioritized. Therefore, a decision is required to determine how shared resources will be utilized. For example, how will tasks be prioritized as they arrive at the beginning of the dispatch pipeline and travel to the shader core.

SUMMARY

What is needed, therefore, are improved arbitration methods and systems that resolve arbitration policies where a system has multiple compute pipelines.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner with respect to resources such as conventional CPUs, conventional GPUs, and/or combinations thereof.

One embodiment of the present invention provides a method of determining priority within a APD that includes compute pipelines. The method includes selecting a first queue and a second queue from the compute pipeline processing queues within each of the compute pipelines in accordance with predetermined criteria and selecting one of the first and second queues for processing in accordance with priority criteria. The selected queue is processed until a lapse of a time quantum occurs or a queue having a higher priority becomes available.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

FIG. 6 is an illustration of an exemplary method according to embodiments of the present invention; and FIG. 7 is an illustration of other aspects of an exemplary method according to embodiments of the present invention.

DETAILED DESCRIPTION OF THE PREFERRED EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
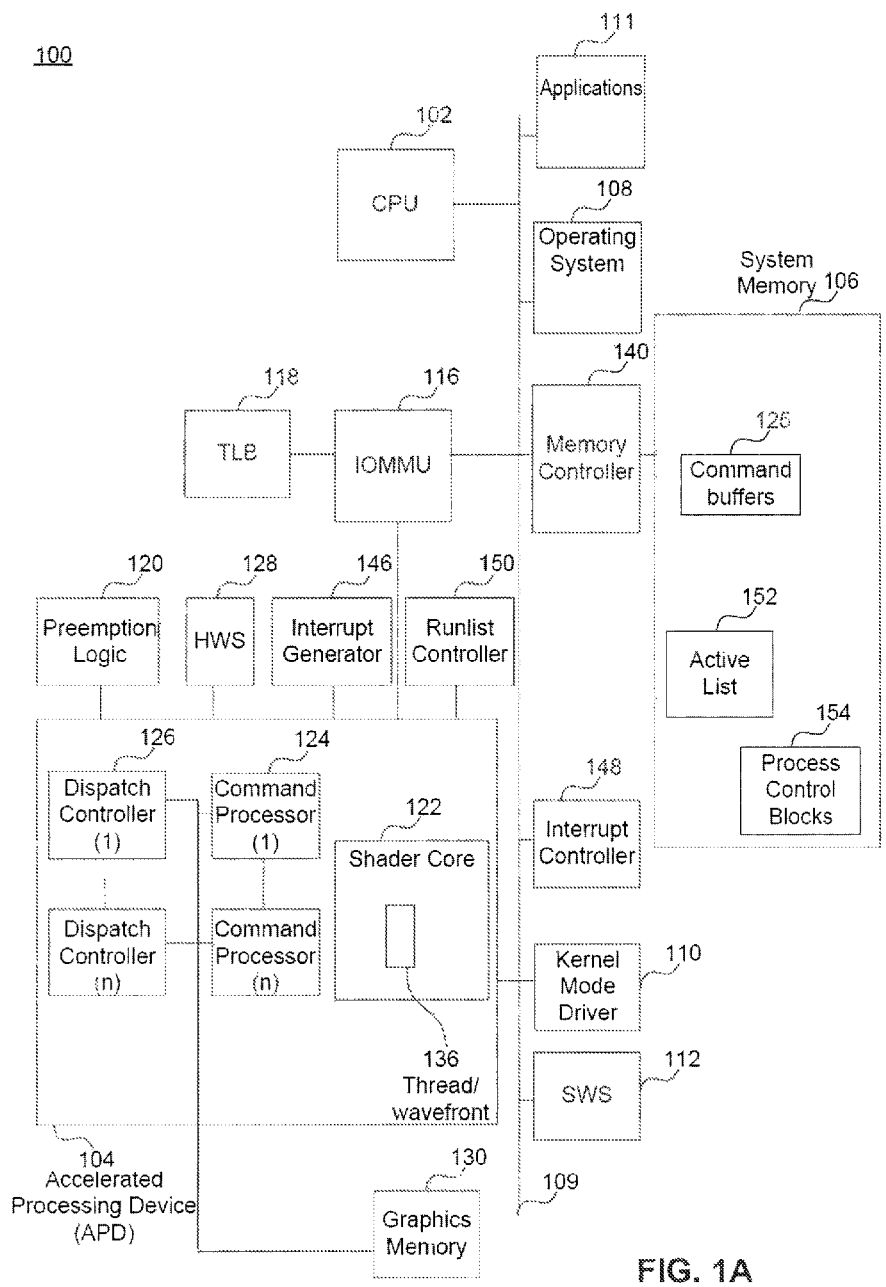
FIG. 1A is an illustrative block diagram of a processing system in accordance with embodiments of the present invention.

FIG. 1A is an exemplary illustration of a unified computing system 100 including a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an OS (OS) 108, and a communication infrastructure 109. The OS 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware dependent and operating-system-specific. They usually provide the interrupt handling required for any necessary asynchronous time-dependent hardware interface. Device drivers, particularly on modern Windows platforms, can run in kernel-mode (Ring 0) or in user-mode (Ring 3).

A benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user modules only through the use of system calls. End user programs like the UNIX shell or other graphical user interface (GUI) based applications are part of the user space. These applications interact with hardware through kernel supported functions.

CFU 102 can include (not shown) one or more of a control processor, field programmable gate array (FPGA), application specific integrated circuit (ASIC), or digital signal processor (DSP). CPU 102, for example, executes the control logic, including the OS 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations, based on commands or instructions received from CPU 102.

For example, commands can be considered a special instruction that is not defined in the ISA and usually accomplished by a set of instructions from a given ISA or a unique piece of hardware. A command may be executed by a special processor such as a dispatch processor, CP, or network controller. On the other hand, instructions can be considered, e.g., a single operation of a processor within a computer architecture. In one example, when using two sets of ISAs, some instructions are used to execute x86 programs and some instructions are used to execute kernels on APU/APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more single instruction multiple data (SIMD) processing cores. As referred to herein, a SIMD is a math pipeline, or programming model, where a kernel is executed concurrently on multiple processing elements each with its own data and a shared program counter. All processing elements execute a strictly identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 to process such data elements in parallel. As referred to herein, for example, a compute kernel is a function containing instructions declared in a program and executed on an APU/APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a work-group executing on a compute unit. Work-items can also be referred to as threads, lanes, or instances.

A work-item is distinguished from other executions within the collection by its global ID and local ID. In one example, a subset of work-items in a workgroup that execute simultaneously together on a single SIMD engine can be referred to as a wavefront 136. The width of a wavefront is a characteristic of the hardware SIMD engine. As referred to herein, a workgroup is a collection of related work-items that execute on a single compute unit. The work-items in the group execute the same kernel and share local memory and work-group barriers. Work groups can also be referred to as thread groups or thread blocks.

All wavefronts from a workgroup are processed on the same SIMD engine. Instructions across a wavefront are issued one at a time, and when all work-items follow the same control flow, each work-item executes the same program. An execution mask and work-item predication are used to enable divergent control flow within a wavefront, where each individual work-item can actually take a unique code path through the kernel. Partially populated wavefronts can be processed when a full set of work-items is not available at wavefront start time. Wavefronts can also be referred to as warps, vectors, or threads.

Commands can be issued one at a time for the wavefront. When all work-items follow the same control flow, each work-item can execute the same program. In one example, an execution mask and work-item predication are used to enable divergent control flow where each individual work-item can actually take a unique code path through a kernel driver. Partial wavefronts can be processed when a full set of work-items is not available at start time. For example, shader core 122 can simultaneously execute a predetermined number of wavefronts 136, each wavefront 136 comprising a predetermined number of work-items.

Within the system 100, APD 104 includes its own memory, such as graphics memory 130. Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or (n) number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or (n) number of dispatch controllers (DCs) 126. In the present application, the term dispatch refers to a command executed by a DC that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the OS 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and a final state. An initial state is a starting point for a machine to process an input data set according to a program in order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102. The term "processing logic" or "logic," as used herein, refers to control flow commands, commands for performing computations, and commands for associated access to resources.

During execution, respective applications, OS functions, processing logic commands, and system software can reside in memory 106. Control logic commands fundamental to OS 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context (sometimes referred to as process) can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects. On the other hand, process can be considered the execution of a program for an application will create a process that runs on a computer. The OS can create data records and virtual memory address spaces for the program to execute. The memory and current state of the execution of the program can be called a process. The OS will schedule tasks for the process to operate on the memory from an initial to final state.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, accelerated graphics port (AGP), or such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, OS 108 includes functionality to manage the hardware components of system 100 and to provide common services. In various embodiments, OS 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, OS 108 invokes an appropriate interrupt handling routine. For example, upon detecting a page fault interrupt, OS 108 may invoke an interrupt handler to initiate loading of the relevant page into memory 106 and to update corresponding page tables.

OS 108 may also include functionality to protect system 100 by ensuring that access to hardware components is mediated through OS managed kernel functionality. In effect, OS 108 ensures that applications, such as applications 111, run on CPU 102 in user space. OS 108 also ensures that applications 111 invoke kernel functionality provided by the OS to access hardware and/or input/output functionality.

By way of example, applications 111 include various programs or commands to perform user computations that are also executed on CPU 102. The unification concepts can allow CPU 102 to seamlessly send selected commands for processing on the APD 104. Under this unified APD/CPU framework, input/output requests from applications 111 will be processed through corresponding OS functionality.

In one example, KMD 110 implements an API through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, OS, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
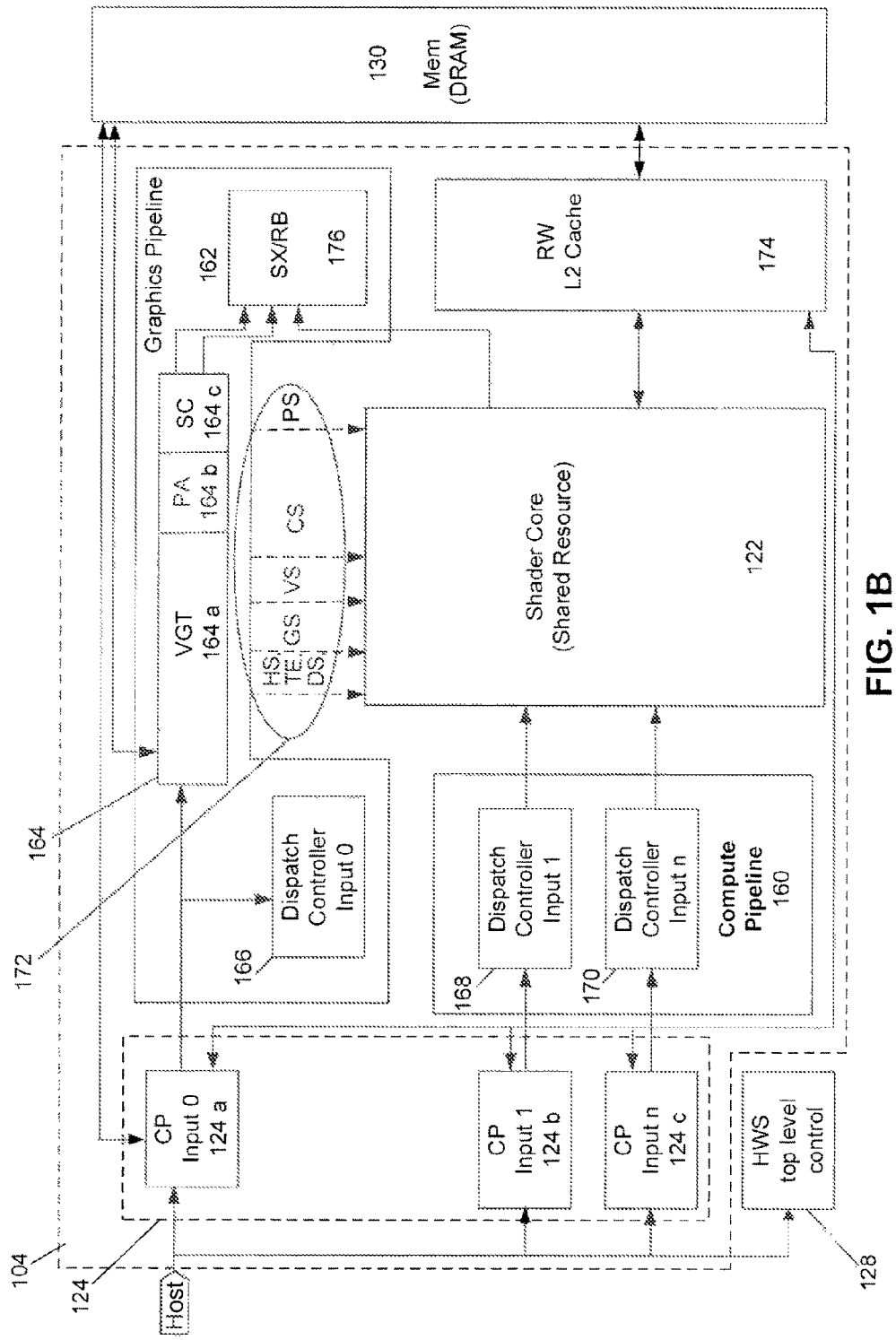
FIG. 1B is an illustrative block diagram illustration of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Although other implementations that would be within the spirit and scope of the present invention can be used.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs are configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. The exception is for graphics work in shader core 122, which can be context switched.

Shader core 122 can be shared by graphics pipeline 162 and compute pipeline 160. Shader core 122 can be a general processor configured to run wavefronts.

In one example, all work within compute pipeline 160 is processed within shader core 122. Shader core 122 runs programmable software code and includes various forms of data, such as state data. Compute pipeline 160, however, does not send work to graphics pipeline 162 for processing. After processing of work within graphics pipeline 162 has been completed, the completed work is processed through a render back unit 176, which does depth and color calculations, and then writes its final results to graphics memory 130.

Figure 2:
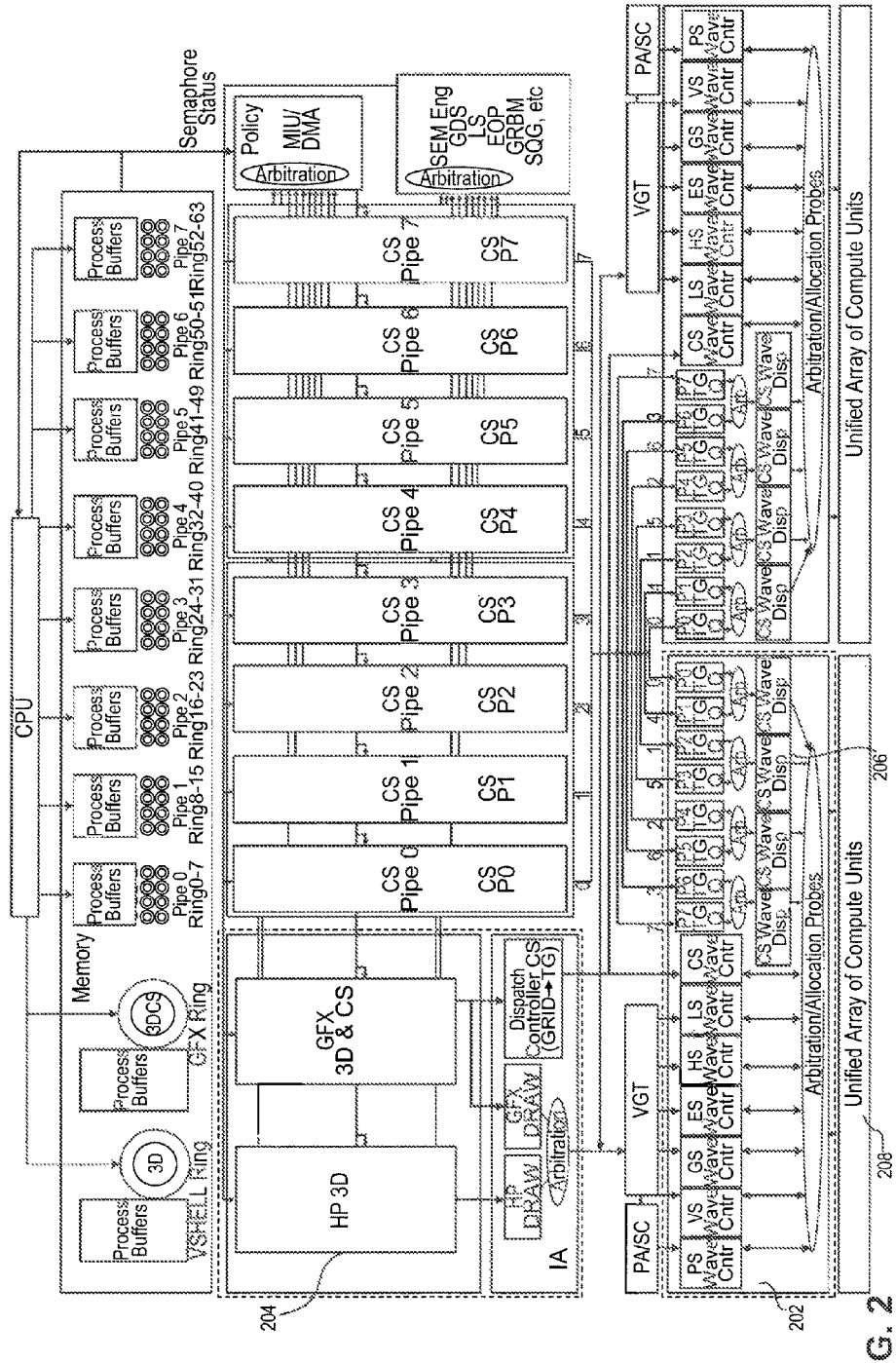
FIG. 2 is a more detailed block diagram illustration of the APD of FIG. 1B.

FIG. 2 is a more detailed block diagram illustration of exemplary APD 104 shown in FIG. 1B. As shown in FIG. 1B., APD 104 includes compute pipeline 160, which provides inputs 1 and input 2 to the Shader core 122. The exemplary APD illustrated in FIG. 2 includes eight compute pipelines CS Pipe 0-CS Pipe 7 (CS P0-CS P7). This configuration is configured to process multiple compute tasks through multiple compute pipelines. The multiple compute pipelines within APD 200 facilitate a flexible resource allocation among compute workloads. Although the exemplary APD 200 illustrates eight compute pipelines, one of ordinary skill in the art will appreciate that other numbers of compute and graphics inputs can be used.

Figure 3:
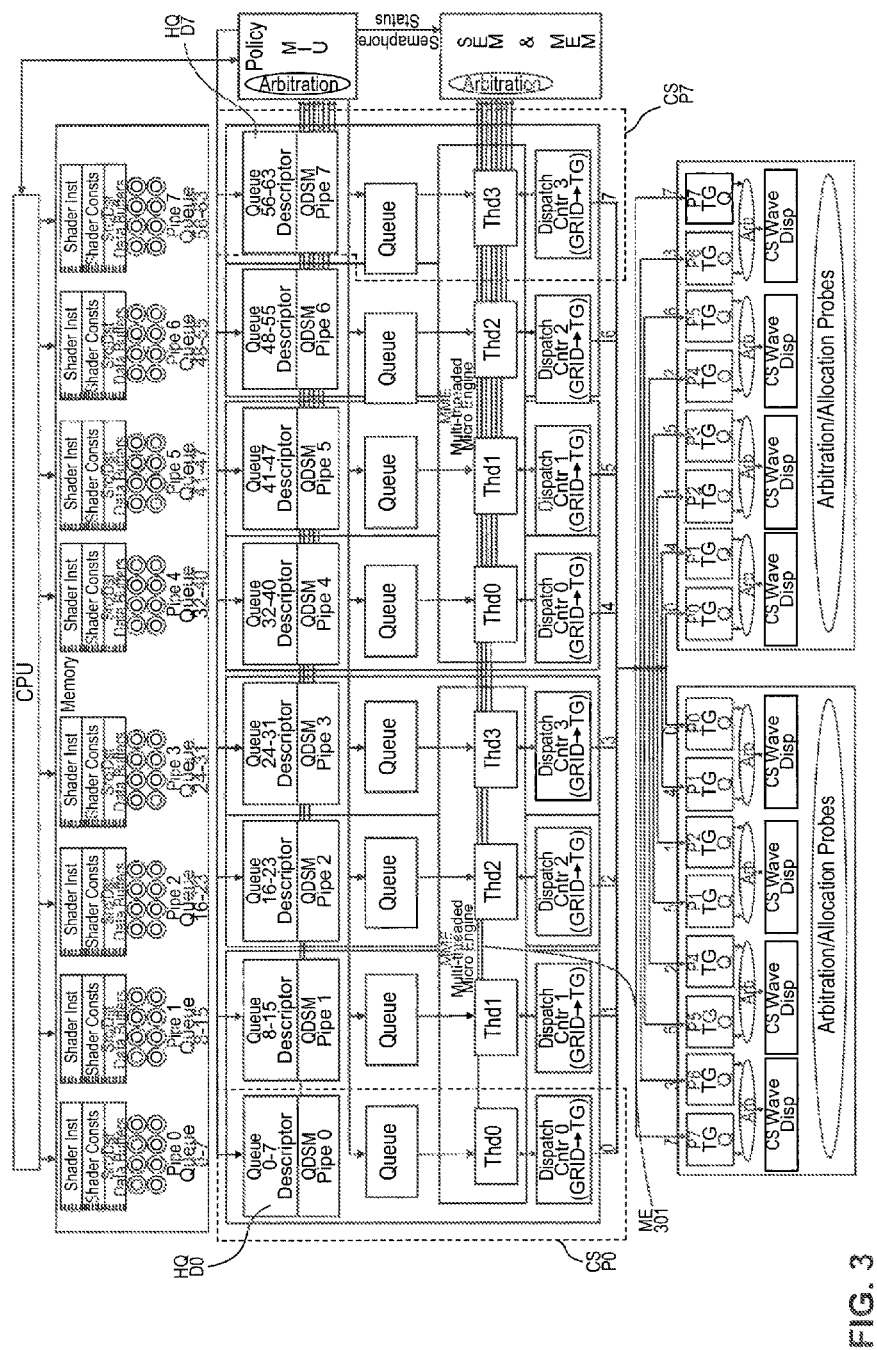
FIG. 3 is more detailed block diagram illustration of compute pipelines the illustration in FIG. 2.

To efficiently process data from multiple compute inputs, arbitration occurs between pipeline queues within compute pipelines CS P0-CS P7, as illustrated in greater detail in FIG. 3. More specifically, arbitration policies in accordance with embodiments of the present invention allocate APD resources among the multiple pipeline inputs. A shader input block (SPI) 202 provides an arbitration scheme for submitting wavefronts between compute pipelines CS P0-CS P7 and graphics pipeline 204. Wave dispatchers 206 are connected from two compute pipelines alternate to forward the wavefronts to shader core 208. Shader core 208 executes the wavefronts.

Figure 4:
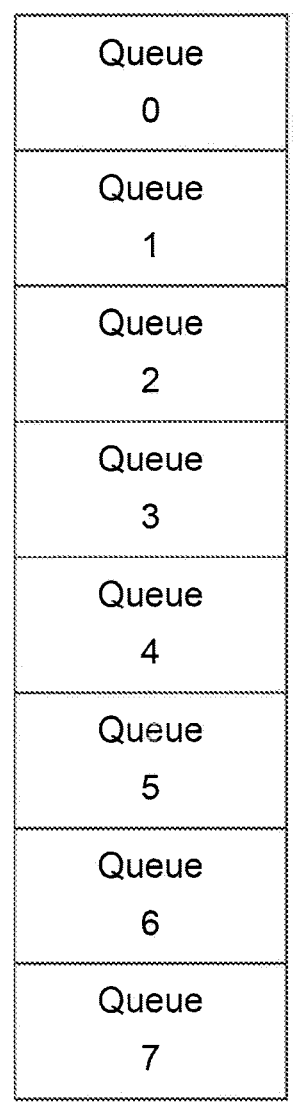
FIG. 4 is an illustration of hardware descriptor queues according to embodiments of the present invention.

FIG. 3 is a more detailed block diagram illustration of compute pipelines CS P0-CS P7 shown in FIG. 2. These eight compute pipelines participate in arbitration for access to the shared shader core 208. Each compute pipeline CS P0-CS P7, for example, includes a hardware queue descriptor 0. Compute pipeline CS P0 is associated with HQD0, compute pipeline CS P1 is associated with HQD1 and so on, to CS P7 and HQD7. Each hardware queue descriptor HQD includes an associated queue of eight memory queues. As shown in FIG. 4, for example, CS P0 is associated with queues Q0-Q7. Similarly, CS P1 is associated with queue Q8-Q15, and so on through CS Pipe 7 queues Q56-Q63. A CP multithreaded microprocessor engine ME 301 and grid DCs Cntr0-Cntr3 are provided to process thread groups.

As discussed above, hardware scheduler HWS 128 is configured to select a scheduled process from RLC 150 for execution on the APD. For example, HWS 128 supports scheduling techniques applied to RLC 150, based upon priority level, or based on other arbitration scheduling criteria. Additionally, KMD 110, together with SWS 112, can perform scheduling of processes to be executed on the APD. The OS SWS 112, for example, can include logic to maintain a prioritized list of processes to be executed on APD 200 as a result of arbitration.

In another illustrative embodiment, arbitration between compute pipelines CS P0-CS P7 hardware queue descriptors HQD0-HQD7 of each pipeline is resolved using a multilevel scheduling process. In implementations with multiple compute inputs, multilevel scheduling can be used to control resource allocation among multi-level priority queues where each compute input is associated with jobs of similar priority.

The OS can schedule the queues Q0-Q7 for processing by compute pipeline hardware queue descriptors HQD0-HQD7 by programming the hardware queue descriptors. Any of the eight hardware queue descriptors HQD can contain an active queue. The queues associated with one compute pipeline may be independent processes or can represent an implementation of a subset of processes. For example, any system established in one pipeline can interact with queues or sets of queues from other compute pipelines through synchronization established in one or more of the shared memories, such as L2 R/W Cache 174, graphics or memory 130 illustrated in FIGS. 1A and 1B The hardware queue descriptor HQD associated with each queue can provide the ability for the OS to pre-empt an active process from dispatching any more work groups that have not yet allocated any shader resources. Any queue that is removed from the hardware can be rescheduled for continuation at a later time or terminated if desired by the OS.

Each of the hardware queue descriptors HQD0-HQD7 can include a memory queue descriptor address MQDA of the OS allotted memory queue descriptor MQD. The OS can use the MQD to store the permanent status of the queue and provide the MQDA address to the HQD so the hardware can update to select fields of the memory queue descriptor. When the memory queue descriptor is disconnected from a HQD, the hardware will use a portion of the MQD to store necessary persistent data temporarily during any pre-emption. A subset of the space can also be used for synchronization coordination between the OS and the HQD.

Queue Arbitration

Figure 5:
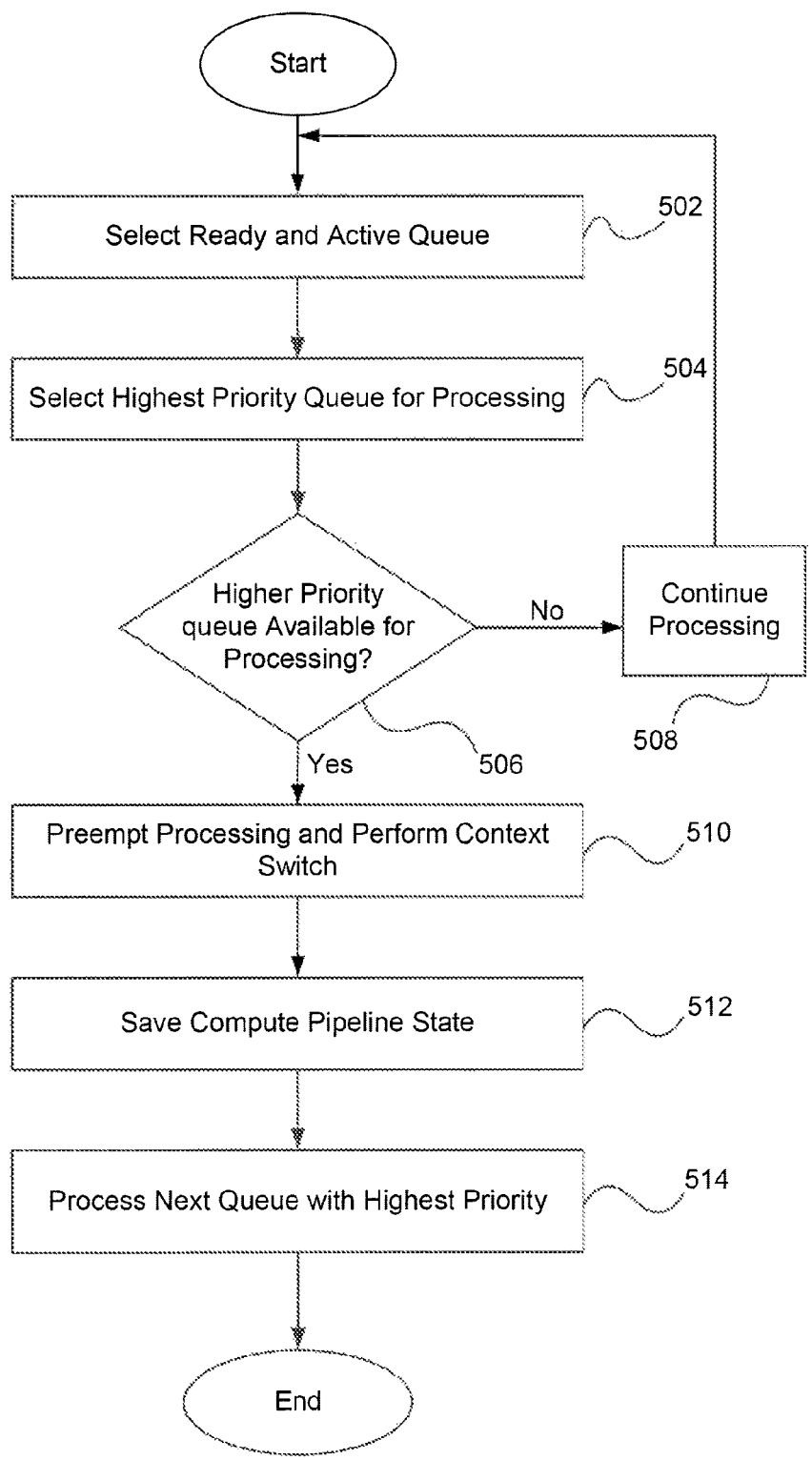
FIG. 5 is a flowchart of an exemplary method of practicing an embodiment of the present invention.

FIG. 5 is a flowchart of an exemplary method of practicing an embodiment of the present invention. In step 502 of FIG. 5, a ready queue and an active queue are selected from among the eight hardware queue descriptors HQD0-HQD7 queues for each compute pipeline CS P0-CS P7. By way of example, the selection can be performed in parallel and independently by each compute pipeline.

in one embodiment of the present invention, the following register controls are provided per wavefront queue packet:
1). Queue Active (1 bit),
2). Queue priority (4 bits 0-15.fwdarw.L-H), 3),
3). Quantum Duration (5 bits in units 5000 clks),
4). Quantum Enable (1 bit),
5). Pipe Priority (2 bits), and
6). Ready (A "Ready" indicates that the queue is active AND (not empty, OR dispatch pipe not empty) AND queue not stalled.

In step 504, the queue with the highest queue priority that is determined to be ready for processing is selected. Once selected, for example, a queue remains selected until one of the following conditions occurs:
1). a higher priority queue becomes ready,
2). a quantum is enabled, such as the processing duration is exceeded and another queue of the same priority is ready for processing,
3). a quantum is disabled and a wavefront packet in the current queue writes any other queue priority register and another queue of same priority is ready,
4). the current queue wavefront packet pre-empts the queue from the compute pipeline and schedules, for example, a smart wait on specific conditions such as timer expiration,
5). a current queue and compute pipeline DC 206 become empty and any other queue in the same compute pipeline is ready, and
6). the OS requests the current queue to pre-empt.

At step 506, the queue arbiter at the top of the compute pipeline signals a respective CP ME 301 thread to stop on the next packet boundary when the arbiter determines a better queue is ready for processing. If it is determined that a better queue is not available, the processes continues at step 508.

At step 510, CP ME 301 performs a context switching routine and signals the fetcher to stop fetching queue data and the DC to stop dispatching wavefronts for the current queue. CP ME 301 can store the restart thread group id of the respective grid DC Contr 0-Contr 3.

At step 512, the switching compute pipeline's current persistent state is stored in the respective memory queue descriptor MQD at a pre-defined offset to be used for state pre-load prior to restarting the queue. An end of process (EOP) fence event can be inserted that targets a MQD with an end of pipe stored word current final read address. In the event the queue is removed from the hardware while work is outstanding in the shader complex, the HQD final read address is be stored in the MQD. Then the low level driver can determine when all outstanding work for the queue has been completed by comparing the top of pipe final read address and the end of pipe final read address, when they match all work has finished At step 514, the state of the previous queue is scheduled to be saved and pre-fetched data is scheduled to be discarded. The CP ME can release the fetcher to select the next queue for processing. If the next queue has first time state bit set, the fetcher will insert a load of the stored persistent state from the MQD followed by the queue read/write pointers setup for queue fetch. In an embodiment, the expected time of a switch can be approximately 500 clocks until CP ME begins processing the next queue.

Consider the following example illustrated in FIG. 6, where, T<n>=time, and n=clk number, QA=Queue Active,
QP=Queue Priority,
QE=Quantum Enable, and
QD=Quantum Duration units of 5000 elks. Time increases vertically, for eight queues Q0-Q7 of a single compute pipeline.

As illustrated in FIG. 6, for each priority level, the compute pipeline maintains a last queue executed scoreboard. A return to that priority level will process the next ready queue. If only one queue is ready in a priority level, it will resume.

The pipes can order the queues from zero to seven, and at reset the previous queue will be set to seven, resulting in Q0.fwdarw.Q7 as the native ordering. If Q0, Q3, Q7 become ready with a queue priority 7 at a quantum enabled just after reset, the queues would process in the following order Q0, Q3, Q7, Q0 etc. If Q5 showed up with the same queue priority level (7), it would get executed after Q3 and before Q7 during the next cycle.

If Q1 and Q4 then arrives with a priority 10 during a Q5 quantum, Q1 preempts Q5, and the system switches on a quantum between Q4 and Q1 repeatedly until the queues become empty or another queue is scheduled for processing. When Q1 and Q4 become empty the process returns to Q7 since Q5 was previously processed at priority 7 level.

FIG. 6 is an illustration of an exemplary method according to embodiments of the present invention. In the example illustrated in FIG. 6, the compute pipeline uses one of two primary methods to yield the pipe to other queues. The first method is in response to the time quantum expiration and the second is the writing to a queue priority register.

As discussed above, a queue with the time quantum enabled and exceeded will enable pre-emption due to an existing queue of the same priority or an arriving queue of the same or higher priority. If the queue is the only highest priority queue, the queue will retain ownership of the compute pipeline until a queue of the same or higher priority becomes ready.

In an alternative embodiment, an arbitration event can be created for any write to queue priority register of the compute pipeline. This method can enable a user to control the amount of work issued prior to enabling other queues of the pipe to make progress. Additionally this alternative embodiment can enable a privileged queue per CP ME.

Arbitration Across Compute Pipelines

Once the highest priority queue has been resolved within each compute pipeline hardware descriptor queue, the next point of arbitration has to resolve which wavefront from the compute pipeline with the highest pipe priority will be submitted to the shader core for processing. Because two compute pipelines share a common DC in an alternating manner, after priority is determined, the shared circuits allocate which compute pipeline is submitted to the shader core.

For example, the participating pipelines can be any of the graphics pipelines, HP3D task (LS, HS, ES, GS, VS, PS) and GFX task (LS, HS, ES, GS, VS, PS, CS), and four of the eight compute pipelines. The compute pipelines can have one of the following pipe priorities: CS_HIGH—above HP3D, CS_MEDIUM—between HP3D and GFX CS_LOW—below GFX.

To resolve a tie between multiple compute pipelines of the same pipe priority level, for example, a least recently issued or least recently used circuit, such as a totem pole circuit can be employed. Each time a pipeline is selected to issue any work to the shader core, the pipeline will be moved to bottom of the least recently issued circuit assigning that pipeline the lowest priority of the pipeline priorities until another pipeline of the same priority issues a wavefront. This special circuit will be used to help foster fairness in issuing work groups of the same priority.

Coming out of reset, the least recently issued list will be P0.fwdarw.P7 with pipe 0 the most favored initially for the given pipe priority.

FIG. 7 is an illustration of an exemplary pipeline arbitration policy. Of the five priority levels of CS HIGH, HP3D, CS MEDIUM, GFX, CS_LOW, from highest to lowest priority levels the best winner will be chosen.

in the example, "bold" pipelines are considered for wavefront launch and "bold and underlined" pipelines are selected for wavefront launch.

The table illustrated in FIG. 7 shows an exemplary totem pole arrangement from left to right. In the example, compute pipelines CS P0.fwdarw.CS P7 are represented by Pn, where n is the compute pipeline providing the wavefront and the (–) means none=no work. H represents—pipe priority High, M—represents pipe priority medium and L represents—pipe priority Low. For each time period, four of the eight compute pipelines that survive compute pipeline pair arbitration by the DC are shown in "bold" and the "bold underlined" compute pipeline is the pipe that pipe arbitration will select of the 6 pipelines that are competed.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for arbitrating between multiple processes to select wavefronts for execution on a shader core, the method comprising:
    executing work, for a first compute pipeline configured to issue wavefronts to the shader core for execution, the work corresponding to a first memory queue descriptor executed using data for the first memory queue descriptor that is loaded into a first hardware queue descriptor;
    detecting a context switch condition;
    responsive to the context switch condition, performing a context switch operation, the context switch operation including loading data for a second memory queue descriptor into the first hardware queue descriptor; and
    executing work corresponding to the second memory queue descriptor using the data for the second memory queue descriptor that is loaded into the first hardware queue descriptor.

2. The method of claim 1, wherein the context switch condition includes:
    a memory queue descriptor having a higher priority than the first memory descriptor becoming ready for execution.

3. The method of claim 1, wherein the context switch condition includes:
    a processing duration for a current quantum for the first memory queue descriptor being exceeded and a different memory queue descriptor having the same priority as the first memory queue descriptor being ready for execution.

4. The method of claim 1, wherein the context switch condition includes:
    a dispatch controller corresponding to the first memory queue descriptor becoming empty and another memory queue descriptor associated with the first compute pipeline is ready.

5. The method of claim 1, wherein the context switch condition includes:
    an explicit request to pre-empty the first memory queue descriptor is received from an operating system.

6. The method of claim 1, wherein:
    the context switch operation also includes detecting that the work for the first memory queue descriptor is not complete and storing state of the first compute pipeline in the first memory queue descriptor.

7. The method of claim 6, further comprising:
    after executing work for the second memory queue descriptor, performing a context switch back to the first memory queue descriptor, the context switch back to the first memory queue descriptor including loading state of the first compute pipeline from the first memory queue descriptor into the first compute pipeline.

8. The method of claim 1, wherein:
    multiple memory queue descriptors are assigned to the hardware queue descriptor; and
    the method further comprises executing work from the multiple memory queue descriptors by cycling through memory queue descriptors of the multiple memory queue descriptors in a round-robin manner.

9. The method of claim 1, further comprising:
    executing work, for a second compute pipeline configured to issue wavefronts to the shader core for execution, the work corresponding to a third memory queue descriptor using data for the third memory queue descriptor that is loaded into a second hardware queue descriptor;
    detecting a second context switch condition;
    responsive to the second context switch condition, performing a second context switch operation, the second context switch operation including loading data for a fourth memory queue descriptor into the second hardware queue descriptor; and
    executing work corresponding to the fourth memory queue descriptor using the data for the fourth memory queue descriptor that is loaded into the second hardware queue descriptor.

10. The method of claim 9, further comprising:
    selecting, via a dispatch controller coupled to both the first compute pipeline and the second pipeline, a wavefront corresponding to the first compute pipeline or a wavefront corresponding to the second compute pipeline for execution on the shader core.

11. The method of claim 10, further comprising:
    issuing the wavefronts for execution on the shader core by counting through ranges within work-item groups corresponding to the first compute pipeline and the second compute pipeline.

12. The method of claim 1, further comprising:
    issuing work from a graphics processing pipeline to the shader core for execution.

13. A processor for arbitrating between multiple processes to select wavefronts for execution on a shader core, the processor comprising:
    a first compute pipeline configured to issue wavefronts to the shader core for execution, the first compute pipeline including a first queue arbiter;
    a hardware queue descriptor associated with the first compute pipeline; and
    the shader core,
    wherein the shader core is configured to execute work for the first compute pipeline, the work corresponding to a first memory queue descriptor executed using data for the first memory queue descriptor that is loaded into the first hardware queue descriptor,
    wherein the first queue arbiter is configured to detect a context switch condition, and, responsive to the context switch condition, perform a context switch operation, the context switch operation including loading data for a second memory queue descriptor into the first hardware queue descriptor, and
    wherein the shader core is configured to execute work corresponding to the second memory queue descriptor using the data for the second memory queue descriptor that is loaded into the first hardware queue descriptor.

14. The processor of claim 13, wherein the context switch condition includes:
    a memory queue descriptor having a higher priority than the first memory descriptor becoming ready for execution.

15. The processor of claim 13, wherein the context switch condition includes:
    a processing duration for a current quantum for the first memory queue descriptor being exceeded and a different memory queue descriptor having the same priority as the first memory queue descriptor being ready for execution.

16. The processor of claim 13, wherein the context switch condition includes:
a dispatch controller corresponding to the first memory queue descriptor becoming empty and another memory queue descriptor associated with the first compute pipeline is ready.

17. The processor of claim 13, wherein the context switch condition includes:
an explicit request to pre-empty the first memory queue descriptor is received from an operating system.

18. The processor of claim 13, wherein:
the context switch operation also includes detecting that the work for the first memory queue descriptor is not complete and storing state of the first compute pipeline in the first memory queue descriptor.

19. The processor of claim 18, wherein the first queue arbiter is configured to:
after the shader core executes work for the second memory queue descriptor, perform a context switch back to the first memory queue descriptor, the context switch back to the first memory queue descriptor including loading state of the first compute pipeline from the first memory queue descriptor into the first compute pipeline.

20. The processor of claim 13, further comprising:
a dispatch controller coupled to both the first compute pipeline and a second pipeline that is also configured to submit wavefronts to the shader core for execution, a wavefront corresponding to the first compute pipeline or a wavefront corresponding to the second compute pipeline for execution on the shader core.

* * * * *